United States Patent
Asplund et al.

(10) Patent No.: US 11,941,172 B2
(45) Date of Patent: Mar. 26, 2024

(54) TRAINING AN EYE TRACKING MODEL

(71) Applicant: TOBII AB, Danderyd (SE)

(72) Inventors: Carl Asplund, Danderyd (SE); Patrik Barkman, Danderyd (SE); Anders Dahl, Danderyd (SE); Oscar Danielsson, Danderyd (SE); Tommaso Martini, Danderyd (SE); Mårten Nilsson, Danderyd (SE)

(73) Assignee: Tobii AB, Danderyd (SE)

( * ) Notice: Subject to any disclaimer, the term of this patent is extended or adjusted under 35 U.S.C. 154(b) by 42 days.

(21) Appl. No.: 17/811,000

(22) Filed: Jul. 6, 2022

(65) Prior Publication Data
US 2022/0334219 A1 Oct. 20, 2022

Related U.S. Application Data

(62) Division of application No. 16/834,153, filed on Mar. 30, 2020, now Pat. No. 11,386,290.

(30) Foreign Application Priority Data

Mar. 29, 2019 (SE) .................................. 1950387-9

(51) Int. Cl.
*G06F 3/01* (2006.01)
*G01S 7/282* (2006.01)
(Continued)

(52) U.S. Cl.
CPC .............. *G06F 3/013* (2013.01); *G01S 7/282* (2013.01); *G01S 7/4008* (2013.01);
(Continued)

(58) Field of Classification Search
CPC .... G06V 40/193; G06V 40/165; A61B 3/113; G02B 27/0093
See application file for complete search history.

(56) References Cited

U.S. PATENT DOCUMENTS 6,659,611 B2 12/2003 Amir et al.
8,055,018 B2 11/2011 Han et al.
(Continued)

FOREIGN PATENT DOCUMENTS

CN 107111355 B 3/2021
EP 3294113 B1 9/2019
(Continued)

*Primary Examiner* — Yosef Kassa
(74) *Attorney, Agent, or Firm* — Christopher Ignatius Moylan (57) ABSTRACT

A method for training an eye tracking model is disclosed, as well as a corresponding system and storage medium. The eye tracking model is adapted to predict eye tracking data based on sensor data from a first eye tracking sensor. The method comprises receiving sensor data obtained by the first eye tracking sensor at a time instance and receiving reference eye tracking data for the time instance generated by an eye tracking system comprising a second eye tracking sensor. The reference eye tracking data is generated by the eye tracking system based on sensor data obtained by the second eye tracking sensor at the time instance. The method comprises training the eye tracking model based on the sensor data obtained by the first eye tracking sensor at the time instance and the generated reference eye tracking data.

24 Claims, 7 Drawing Sheets

(51) Int. Cl.
  *G01S 7/40*   (2006.01)
  *G01S 13/00*   (2006.01)
  *G06F 18/214*   (2023.01)
  *G06V 40/19*   (2022.01)
  *G01S 7/285*   (2006.01)

(52) U.S. Cl.
  CPC .......... *G01S 13/003* (2013.01); *G06F 18/214* (2023.01); *G06V 40/19* (2022.01); *G01S 7/285* (2013.01)

(56) References Cited

U.S. PATENT DOCUMENTS

| | | |
|---|---|---|
| 8,255,827 B2 | 8/2012 | Malik |
| 8,299,979 B2 | 10/2012 | Rambo et al. |
| 8,328,653 B2 | 12/2012 | Lock |
| 8,447,128 B2 | 5/2013 | Kameyama |
| 8,462,226 B2 | 6/2013 | Kameyama |
| 8,553,936 B2 | 10/2013 | Fogt |
| 8,593,375 B2 * | 11/2013 | Maltz .................... G02B 27/017 |
| | | 345/8 |
| 9,004,687 B2 * | 4/2015 | Stack .................... A61B 5/6803 |
| | | 351/209 |
| 9,202,280 B2 * | 12/2015 | Wu ....................... G02B 27/017 |
| 9,557,812 B2 * | 1/2017 | Maltz ...................... G06F 3/013 |
| 9,563,805 B2 * | 2/2017 | Cheung ................. A61B 3/113 |
| 9,613,286 B2 * | 4/2017 | Son ....................... G06V 40/193 |
| 10,108,261 B1 | 10/2018 | Hall et al. |
| 2015/0085251 A1 | 3/2015 | Larsen |

FOREIGN PATENT DOCUMENTS

| | | |
|---|---|---|
| WO | 20110118292 A1 | 10/2010 |
| WO | 2015048030 A1 | 4/2015 |
| WO | 2015085251 A1 | 1/2019 |

* cited by examiner

TRAINING AN EYE TRACKING MODEL

CROSS-REFERENCES TO RELATED APPLICATIONS

This application is a Divisional of U.S. application Ser. No. 16/834,153, filed Mar. 30, 2020, which claims priority to Swedish Application No. 1950387-9, filed Mar. 29, 2019; the content of both such applications are hereby incorporated by reference in their entirety.

TECHNICAL FIELD

The present disclosure generally relates to eye tracking.

BACKGROUND

Different techniques have been developed for monitoring in which direction (or at which point on a display) a user is looking. This is often referred to as gaze tracking. Such techniques often involve detection of certain features in images of the eye, and a gaze direction or gaze point is then computed based on positions of these detected features. An example of such a gaze tracking technique is pupil center corneal reflection (PCCR). PCCR-based gaze tracking employs the position of the pupil center and the position of glints (reflections of illuminators at the cornea) to compute a gaze direction of the eye or a gaze point at a display.

Another term which is often employed in this context is eye tracking. While the term eye tracking may in many cases be employed as an alternative name for gaze tracking, eye tracking need not necessarily involve tracking of the user's gaze (for example in the form of a gaze direction or a gaze point). Eye tracking may for example relate to tracking of the position of an eye in space, without actually tracking a gaze direction or gaze point of the eye.

As an alternative (or complement) to conventional techniques such as PCCR-based eye tracking, machine learning may be employed to train an algorithm to perform eye tracking. For example, the machine learning may employ training data in the form of images of the eye and associated known gaze points to train the algorithm, so that the trained algorithm can perform eye tracking in real time based on images of the eye. Plenty of training data is typically needed for such machine learning to work properly. The training data may take quite some time and/or resources to collect. In many cases, certain requirements may be put on the training data. The training data should for example preferably reflect all those types of cases/scenarios that the eye tracking algorithm is supposed to be able to handle. If only certain types of cases/scenarios are represented in the training data (for example only small gaze angles, or only well-illuminated images), then the eye tracking algorithm may perform well for such cases/scenarios, but may not perform that well for other cases/scenarios not dealt with during the training phase.

It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of a method for training an eye tracking model. The eye tracking model is adapted to predict eye tracking data based on sensor data from a first eye tracking sensor. The method comprises receiving sensor data obtained by the first eye tracking sensor at a time instance, and receiving reference eye tracking data for the time instance generated by an eye tracking system comprising a second eye tracking sensor. The reference eye tracking data is generated by the eye tracking system based on sensor data obtained by the second eye tracking sensor at the time instance. The method comprises training the eye tracking model based on the sensor data obtained by the first eye tracking sensor at the time instance and the generated reference eye tracking data.

As described above in the background section, traditional training data may take quite some time and/or resources to collect. Reference eye tracking data from an already working eye tracking system may be employed as an alternative or complement to such traditional training data for training an eye tracking model.

It will be appreciated that eye tracking data (such as the predicted eye tracking data or the reference eye tracking data) may for example indicate a gaze point of an eye at a display, and/or a gaze vector, and/or a position of an eye in space.

A second aspect provides embodiments of a system for training an eye tracking model. The eye tracking model is adapted to predict eye tracking data based on sensor data from a first eye tracking sensor. The system comprises processing circuitry (or one or more processors) configured to receive sensor data obtained by the first eye tracking sensor at a time instance, and receive reference eye tracking data for the time instance generated by an eye tracking system comprising a second eye tracking sensor. The reference eye tracking data is generated by the eye tracking system based on sensor data obtained by the second eye tracking sensor at the time instance. The processing circuitry is configured to train the eye tracking model based on the sensor data obtained by the first eye tracking sensor at the time instance and the generated reference eye tracking data.

The processing circuitry (or one or more processors) may for example be configured to perform the method as defined in any of the embodiments of the first aspect disclosed herein (in other words, in the claims, the summary, the detailed description, or the drawings). The system may for example comprise one or more non-transitory computer-readable storage media (or one or more memories) storing instructions that, upon execution by the processing circuitry (or one or more processors), cause the system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions for training an eye tracking model. The eye tracking model is adapted to predict eye tracking data based on sensor data from a first eye tracking sensor. The instructions, when executed by a system, cause the system to:

receive sensor data obtained by the first eye tracking sensor at a time instance;

receive reference eye tracking data for the time instance generated by an eye tracking system comprising a second eye tracking sensor, wherein the reference eye tracking data is generated by the eye tracking system based on sensor data obtained by the second eye tracking sensor at the time instance; and train the eye tracking model based on the sensor data obtained by the first eye tracking sensor at the time instance and the generated reference eye tracking data.

The non-transitory computer-readable storage medium may for example store instructions which, when executed by a system (or by processing circuitry comprised in the system), cause the system to perform the method as defined in any of the embodiments of the first aspect disclosed herein (in other words, in the claims, the summary, the drawings, or the detailed description).

The non-transitory computer-readable storage medium may for example be provided in a computer program product. In other words, a computer program product may for example comprise a non-transitory computer-readable storage medium storing instructions which, when executed by a system, cause the system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Throughout the present disclosure, the term eye tracking sensor relates to a sensor which is adapted to obtain sensor data for use in eye tracking. While an eye tracking sensor may for example be an imaging device (such as a camera), several other types of sensors could be employed for eye tracking. For example, an eye tracking sensor may employ light, sound, a magnetic field, or an electric field to obtain sensor data which may be employed (for example in combination with sensor data from other sensors) for determining where the eye is located and/or in which direction the eye is gazing. An eye tracking sensor may for example be arranged to (or configured to) monitor an eye. An eye tracking sensor may for example be arranged to (or configured to) perform measurements (or to obtain sensor data) when instructed to do so. In other words, an eye tracking sensor need not necessarily perform a constant/continuous monitoring of the eye.

Throughout the present disclosure, the term imaging device relates to a device which is adapted to capture images. An imaging device may for example be an image sensor or a camera, such as a charge-coupled device (CCD) camera or a Complementary Metal Oxide Semiconductor (CMOS) camera. However, other types of imaging devices may also be envisaged.

Embodiments of methods, systems, and associated storage media will be described below with reference to FIGS. 3-11. First, certain features of an eye will be described with reference to FIGS. 1-2.

Figure 1:
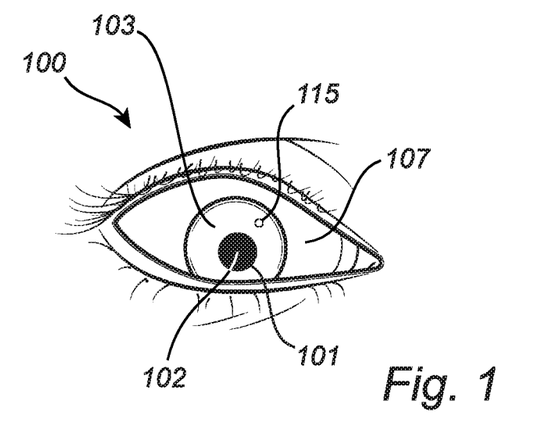
FIG. 1 is a front view of an eye.
Figure 2:
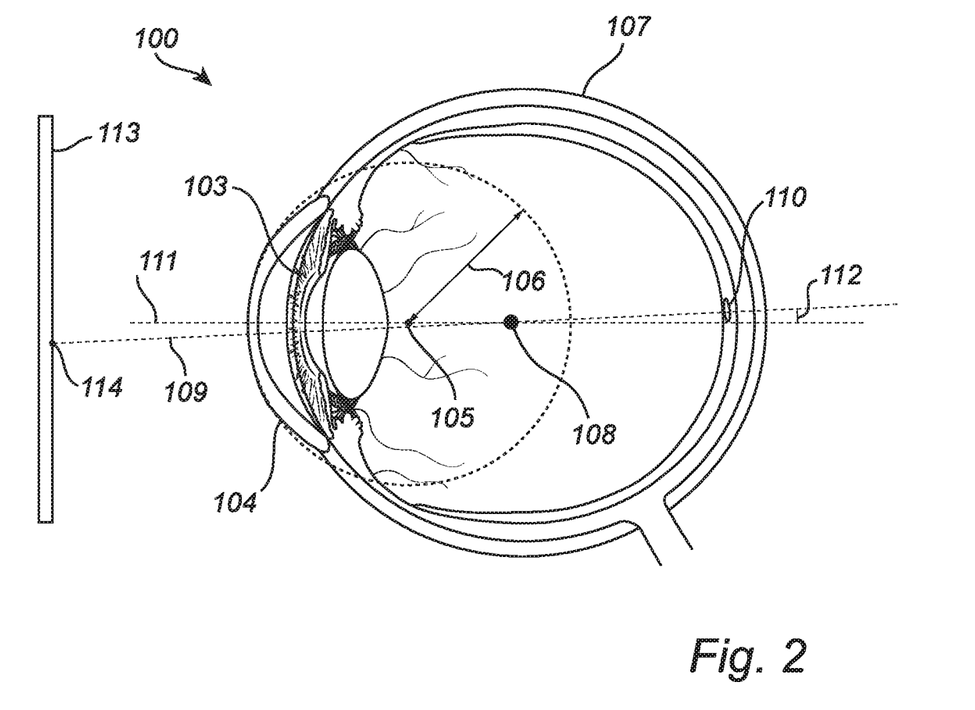
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a pupil 101, which has a pupil center 102. The eye 100 also has an iris 103 and a cornea 104. The cornea 104 is located in front of the pupil 101 and the iris 103. The cornea 104 is curved and has a center of curvature 105 which is referred to as the center 105 of corneal curvature, or simply the cornea center 105. The cornea 104 has a radius of curvature 106 referred to as the radius 106 of the cornea 104, or simply the cornea radius 106. The eye 100 also has a sclera 107. The eye 100 has a center 108 which may also be referred to as the center 108 of the eye ball, or simply the eye ball center 108. The visual axis 109 of the eye 100 passes through the center 108 of the eye 100 to the fovea 110 of the eye 100. The optical axis 111 of the eye 100 passes through the pupil center 102 and the center 108 of the eye 100. The visual axis 109 forms an angle 112 relative to the optical axis 111. The deviation or offset between the visual axis 109 and the optical axis 111 is often referred to as the fovea offset 112. In the example shown in FIG. 2, the eye 100 is looking towards a display 113, and the eye 100 is gazing at a gaze point 114 at the display 113. FIG. 1 also shows a reflection 115 of an illuminator at the cornea 104. Such a reflection 115 is also known as a glint 115.

Training of machine learning (ML) based eye tracking algorithms typically requires a very large number of images of the eye that are annotated with ground truth information, such as gaze origin (3D eye position), gaze direction, gaze point on screen, etc. In traditional data collections, test subjects are asked to look at points with a known location on a display to gather ground truth gaze data. There are several problems with this approach:

- The interaction of the test subject with the computer often becomes unnatural and the training data therefore fails to capture real-life behavior, which is important for machine learning to be successful.
- The test has to be administered by a test leader, to manage the data collection application and explain to the test subjects how to behave during the test. This makes data collection quite expensive, even without counting the compensation given to the test subjects.
- The latency from "need for data" to "finished data collection" may be high (in some cases several months), since traditional data collection requires setup of data collection tools, order of data collection and allocation of data collection resources.
- Looking at dots on a display is quite boring and test subjects often loose attention, leading to bad data.
- During traditional data collection, one can only make short recordings for each individual (due to loss of attention and because the test subject can do nothing else during data collection).
- Some information may be difficult or even impossible to measure accurately. For example, the distance from the user to the eye tracker may be difficult to measure.

If one instead uses a conventional, calibrated eye-tracker to supply this ground truth data, then the data collection would cost almost nothing and result in large quantities of natural (real life-like situation) training data. One could let a user work as normal in front of his/her computer while a ML-based eye tracker collects time-stamped sensor data (such as images) and a reference eye tracker collects ground truth information (such as gaze points, 3D positions of the eye, gaze directions etc.). Such a system can run in the background on a test subject's computer. At the end of a working day a large amount of annotated data will have been collected that can be used to train ML-based algorithms.

Figure 3:
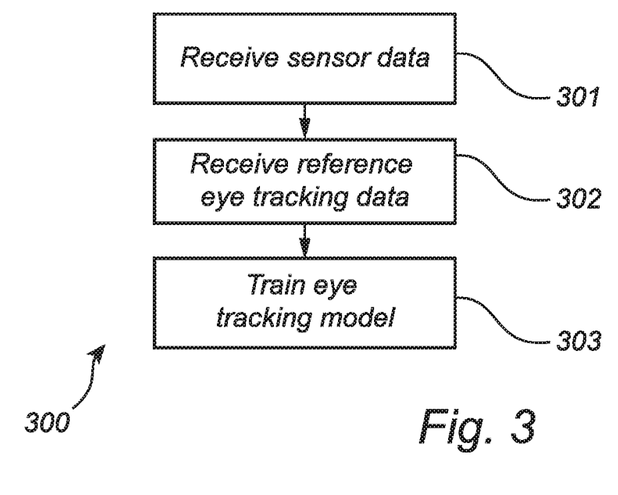
FIG. 3 is a flow chart of method for training an eye tracking model, according to an embodiment.

Hence, a method for training an eye tracking model is proposed. FIG. 3 is a flow chart of an embodiment of this method 300. In the present embodiment, the eye tracking model is adapted to predict eye tracking data based on sensor data from a first eye tracking sensor. In other words, the eye tracking model is configured to predict or estimate eye tracking data using sensor data from the first eye tracking sensor, or using information derived from such sensor data. The eye tracking model may for example be regarded as a function (or a mapping) which receives sensor data from the first eye tracking sensor as input (and which optionally also receives further input data) and which provides predicted eye tracking data as output.

The eye tracking model which is trained in the method 300 may for example be a machine learning (ML) based eye tracking model. The eye tracking model may for example be based on an artificial neural network, such as a convolutional neural network. However, the eye tracking model could also be a more traditional model, which may for example be trained by traditional optimization of values of a set of parameters.

The method 300 comprises receiving 301 sensor data obtained by the first eye tracking sensor at a time instance (or at a point in time). In other words, the sensor data is received 301 after having been obtained (or generated) by the first eye tracking sensor at a certain time instance or point in time. The first eye tracking sensor may for example be an imaging device. However, as described above, several other types of eye tracking sensors may also be envisaged.

The method 300 comprises receiving 302 reference eye tracking data for the time instance generated by an eye tracking system comprising a second eye tracking sensor. The reference eye tracking data is generated by the eye tracking system based on sensor data obtained by the second eye tracking sensor at the time instance (in other words, at the point in time when the received 301 sensor data was obtained by the first eye tracking sensor). The second eye tracking sensor may for example be an imaging device. However, as described above, several other types of eye tracking sensors may also be envisaged. It will be appreciated that the second eye tracking sensor is distinct from the first eye tracking sensor. In other words, the first and second eye tracking sensors do not coincide, but they could for example of a similar type.

The method 300 comprises training 303 the eye tracking model based on the sensor data obtained by the first eye tracking sensor at the time instance and the generated reference eye tracking data. The training may for example comprise adapting values for one or more parameters of the eye tracking model.

It will be appreciated that the sensor data received at step 301 and the sensor data on which the reference eye tracking data received at step 302 is based need not necessarily be obtained by the first and second eye tracking sensors at exactly the same time instance. In other words, these two sets of sensor data may be obtained by the respective eye tracking sensors at approximately the same time instance, but there may of course be a slight deviation or timing mismatch between these two sets of sensor data. It will be appreciated that as long as such a deviation is so small that the eye has not moved (or has not been redirected) too much during this very short time period, the step of training 303 the eye tracking model will not be significantly affected by the mismatch.

Figure 4:
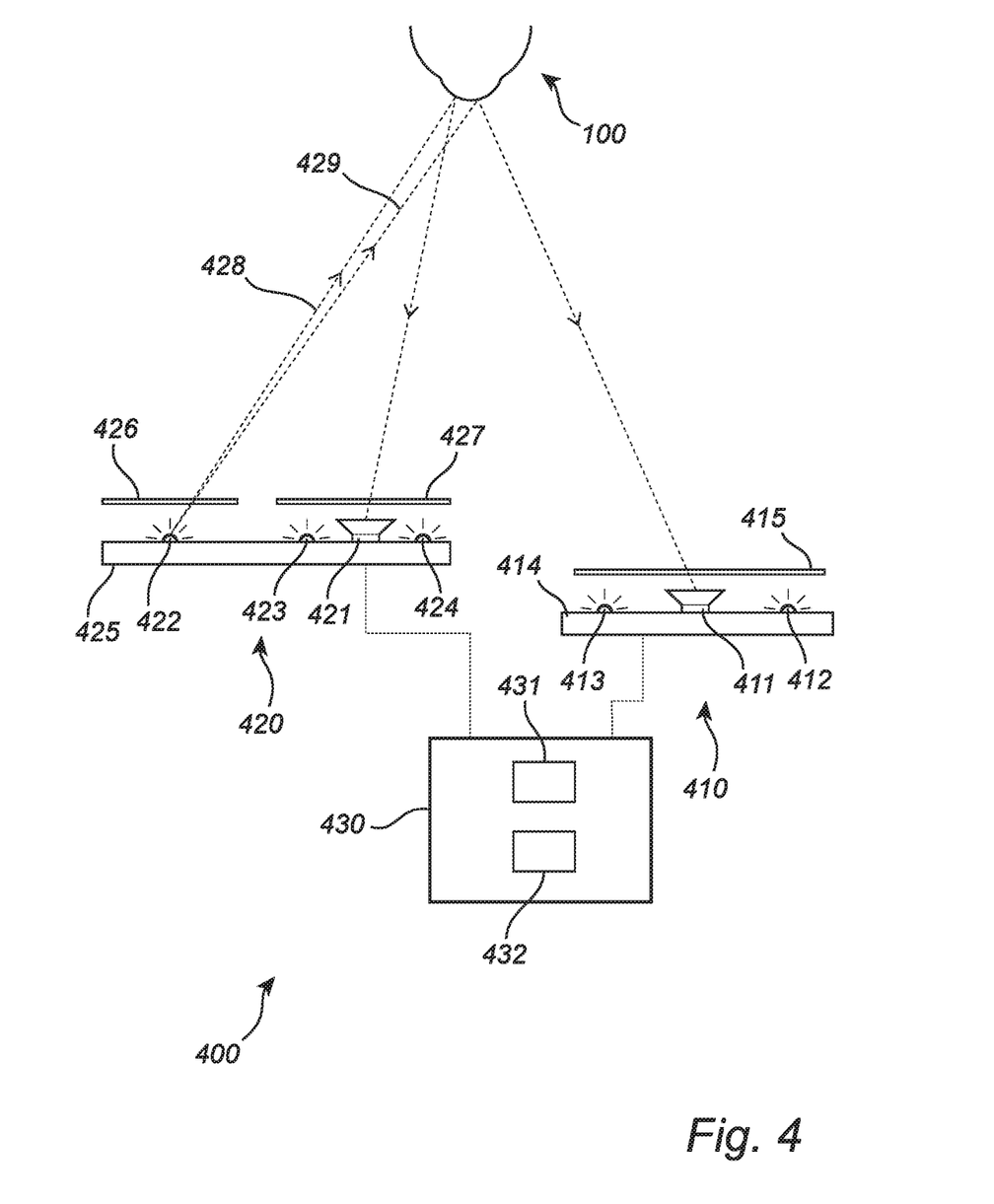
FIG. 4 is a schematic overview of a system for training an eye tracking model, according to an embodiment.

FIG. 4 is a schematic overview of a system 400 for training an eye tracking model, according to an embodiment. The system 400 may for example perform the method 300 described above with reference to FIG. 3.

Consider the following scenario. You have a well-functioning eye tracking system 420 which comprises an eye tracking sensor 421 and means for analyzing the sensor data to generate eye tracking data, such as an estimated position of the eye 100 in space, or an estimated gaze point of the eye 100. You have a new eye tracking system 410 which comprises an eye tracking sensor 411, but the new eye tracking system is not yet able to generate accurate gaze tracking data based on sensor data from the eye tracking sensor 411. The software or algorithm employed in the old eye tracking system 420 is not that useful for the new eye tracking system 410 for a reason such as:

- the new eye tracking system 410 uses a different type of eye tracking sensor 411 than the old eye tracking system 420, or
- the old eye tracking system 420 is equipped with an illuminator 422 which is not available in the new eye tracking system 410, or
- an illuminator 412 is available in the eye tracking system 410 but it is located at a different portion relative to the eye tracking sensor 411 than in the old eye tracking system 420.

Therefore, instead of reusing software from the old eye tracking system 420 in the new eye tracking system 410, the old eye tracking system 420 is employed to provide ground truth data for training of the new eye tracking system 410. The new eye tracking system 410 is equipped with an eye tracking model adapted to predict eye tracking data based on sensor data obtained by the eye tracking sensor 411. The method 300 described above with reference to FIG. 3 may then be employed for training the eye tracking model of the new eye tracking system 410, using the old eye tracking system 420 to generate reference eye tracking data. In the terminology of the method 300, the eye tracking sensor 411 is an example of the first eye tracking sensor which obtained the sensor data received at step 301, and the old eye tracking system 420 is an example of the eye tracking system which generated the reference eye tracking data received at step 302. Further, the eye tracking sensor 421 is an example of the second eye tracking system referred to in the method 300.

The system 400 comprises processing circuitry 430 configured to perform the method 300 to train the eye tracking model of the new eye tracking system 410.

The processing circuitry 430 may for example comprise one or more processors 431. The processor(s) 431 may for example be application-specific integrated circuits (ASIC) configured to perform a specific method (such as the method 300). Alternatively, the processor(s) 431 may be configured to execute instructions (for example in the form of a computer program) stored in one or more memories 432. Such one or more memories 432 may for example be comprised in the processing circuitry 430 of the system 400, or may be external to (for example located remotely from) the system 400. The one or more memories 432 may for example store instructions for causing the system 500 to perform the method 300.

The processing circuitry 430 may be communicatively connected to the old eye tracking system 420 and the new eye tracking system 410 (or at least to the eye tracking sensor 411 in the new eye tracking system 410), for example via wired and/or wireless connections.

The old eye tracking system 420 may for example be a PCCR-based eye tracking system. In other words, the reference eye tracking data received at step 302 in the method 300 may have been generated by the eye tracking system 420 based on an image position of a corneal reflection of an illuminator 422 at a known position in relation to the eye tracking sensor 421 (which in this case is an imaging device) and an image position of a pupil center.

The old eye tracking system 420 may for example comprise more eye tracking sensors, or more advanced eye tracking sensors, or more illuminators than the new eye tracking system 410. By training the new eye tracking system 410 using a more advanced eye tracking system 420, an eye tracking system 410 with relatively cheaper components could be obtained, which is able to perform almost as well as the more advanced eye tracking system 420.

In the example implementation shown in FIG. 4, the eye tracking sensor 421 in the old eye tracking system 420 is an imaging device (such as a camera), and one or more illuminators 422-424 are provided for illuminating the eye 100. In the present example implementation, the eye tracking sensor 411 in the new eye tracking system 410 is also an imaging device. Light 428 from the illuminator 422 in the old eye tracking system 420 reaches the imaging device 421 in the old eye tracking system 420 via a reflection at the cornea of the eye 100. However, light 429 from the illuminator 422 in the old eye tracking system 420 may also reach the imaging device 411 in the new eye tracking system 420, which may case interference in images captured by the imaging device 411 in the new eye tracking system 410. A filter 415 may therefore be employed to prevent light 429 from the illuminator 422 from reaching the imaging device 411.

Hence, according to some embodiments, the old eye tracking system 420 comprises an illuminator 422 which outputs light 428 within a wavelength range for illuminating an eye 100, and the eye tracking sensor 421 of the old eye tracking system 420 provides sensor data based on light within the wavelength range. The eye tracking sensor 411 of the new eye tracking system 410 may be provided with a filter 415 for suppressing light within the wavelength range. Light emitted by the illuminator 422 may for example be light of a relatively long wave length, and the filter 415 may be a short pass filter. Alternatively, light emitted by the illuminator 422 may for example be light of a relatively short wave length, and the filter 415 may be a long pass filter. If light emitted by the illuminator 422 is not restricted to a certain wavelength range, a filter 426 may for example be provided in front of the illuminator 422 for suppressing light outside a certain wavelength range.

Similarly, if the new eye tracking system 410 comprises one or more illuminators 412-413 for illuminating the eye 100, the eye tracking sensor 421 in the old eye tracking system 420 may be provided with a filter 427 for suppressing light from the illuminator in the new eye tracking system 410. Light emitted by the illuminator 412 may for example be light of a relatively long wave length, and the filter 427 may be a short pass filter. Alternatively, light emitted by the illuminators 412 may for example be light of a relatively short wave length, and the filter 427 may be a long pass filter. If light emitted by the illuminator 412 is not restricted to a certain wavelength range, a filter 415 may be provided in front of the illuminator 412 for suppressing light outside a certain wavelength range.

In this way, the two eye tracking systems 410 and 420 are prevented from interfering with each other. In other words, the old eye tracking system 420 may employ light in a first wavelength range (for example around 940 nm), while the new eye tracking system employs light in a second wavelength range (for example about 850 nm) which does not overlap the first wavelength range.

As shown in FIG. 4, the old eye tracking system 420 and/or the new eye tracking system 410 may comprise one or more illuminators. The illuminators may for example be infrared or near infrared illuminators, for example in the form of light emitting diodes (LEDs). However, other types of illuminators may also be envisaged.

As shown in FIG. 4, the old eye tracking system 420 may for example comprise a member 425 (for example a circuit board, such as a printed circuit board, PCB) at which the eye tracking sensor 421 and the illuminators 422-424 are mounted. Similarly, the new eye tracking system 410 may for example comprise a member 414 (for example a circuit board, such as a PCB) at which the eye tracking sensor 411 and the illuminators 412-413 are mounted.

It will be appreciated that the system 400 need not necessarily comprise all those components shown in FIG. 4. For example, the system 400 could comprise only the processing circuitry 431, and the rest of the components shown in FIG. 4 could be regarded as external to the system 400. In some embodiments, the system 400 comprises the eye tracking system 420 employed to generate the reference eye tracking data received at step 302 in the method 300. In some embodiments, the system 400 comprises the eye tracking sensor 411 employed to obtain the sensor data received at step 301 in the method 300.

The eye tracking system 420 and the eye tracking system 410 may for example be provided in the form of two separate units or devices, which may for example be mountable at a display device for performing eye tracking.

Figure 5:
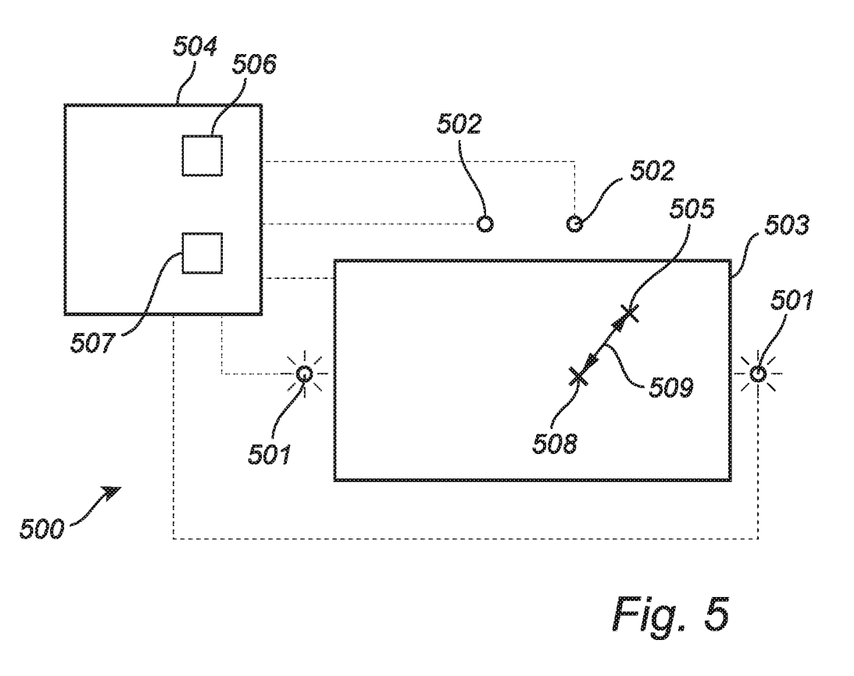
FIG. 5 is a schematic overview of an example eye tracking system.

FIG. 5 is a schematic overview of an example eye tracking system 500. The old eye tracking system 420 and/or the new eye tracking system 410 in FIG. 4 may for example be of the type described below with reference to FIG. 5.

The system 500 comprises one or more illuminators 501 for illuminating the eye 100 and one or more imaging devices 502 for capturing images of the eye 100 while the eye 100 looks at a display 503. The system 500 also comprises processing circuitry 504 configured to estimate where the eye 100 is located and/or where the eye 100 looking. The processing circuitry 504 may for example estimate eye tracking data such as a gaze direction (or gaze vector) of the eye 100 (corresponding to a direction of the visual axis 109), or a gaze point 508 of the eye 100 at the display 503. In other words, the eye tracking system 500 may for example be a gaze tracking system.

The processing circuitry 504 is communicatively connected to the illuminators 501 and the imaging devices 502, for example via a wired or wireless connection. The processing circuitry 504 may also be communicatively connected to the display 503, for example for controlling (or triggering) the display 503 to show test stimulus points for calibration of the eye tracking system 500.

FIG. 5 shows example illuminators 501 located at either side of the display 503, but the illuminators 501 could be located elsewhere. FIG. 5 shows example imaging devices 502 located above the display 503, but the imaging devices 502 could be located elsewhere, for example below the display 503.

The display 503 may for example be a liquid-crystal display (LCD) or a LED display. However, other types of displays may also be envisaged. The display may 503 may for example be flat or curved. The display 503 may for example be a TV screen, a computer screen, or may be part of a head-mounted device (HMD) such as a virtual reality (VR) or augmented reality (AR) device. The display 503 may for example be placed in front of one of the user's eyes. In other words, separate displays 503 may be employed for the left and right eyes. Separate eye tracking equipment (such as illuminators 501 and imaging devices 502) may for example be employed for the left and right eyes.

The processing circuitry 504 may be employed for eye tracking for both eyes, or there may be separate processing circuitry 504 for the left and right eyes. The eye tracking system 500 may for example perform eye tracking for the left and right eyes separately, and may then determine a combined gaze point as an average of the gaze points for the left and right eyes.

The processing circuitry 504 may for example comprise one or more processors 506. The processor(s) 506 may for example be application-specific integrated circuits (ASIC) configured to perform a specific eye tracking method. Alternatively, the processor(s) 506 may configured to execute instructions (for example in the form of a computer program) stored in one or more memories 507. Such a memory 507 may for example be comprised in the processing circuitry 504 of the eye tracking system 500, or may be external to (for example located remotely from) the eye tracking system 500. The memory 507 may store instructions for causing the eye tracking system 500 to perform an eye tracking method.

It will be appreciated that the eye tracking system 500 described above with reference to FIG. 5 is provided as an example, and that many other eye tracking systems may be envisaged. For example, the illuminators 501 and/or the imaging devices 502 need not necessarily be regarded as part of the eye tracking system 500. The eye tracking system 500 may for example consist only of the processing circuitry 504. There are even eye tracking systems that do not employ illuminators at all. Further, some eye tracking systems employ other types of eye tracking sensors than imaging devices. In other words, the eye tracking system 500 could employ other types of sensor data than images to perform eye tracking. The display 503 may for example be comprised in the eye tracking system 500, or may be regarded as separate from the eye tracking system 500.

The method 300 described above with reference to FIG. 3 may for example receive data passively at the steps 301 and 302 from the first eye tracking sensor (exemplified in FIG. 4 by the sensor 411) and the eye tracking system (exemplified in FIG. 4 by the system 420). However, the method 300 may further comprise using the first eye tracking sensor to obtain sensor data at the time instance (in other words, the sensor data received at step 301), and/or using the eye tracking system to generate the reference eye tracking data for the time instance (in other words, the eye tracking data received at step 302). In other words, the method 300 may actively use the first eye tracking sensor 411 and the eye tracking system 420, for example by controlling (or instructing) them to provide the necessary data.

Figure 6:
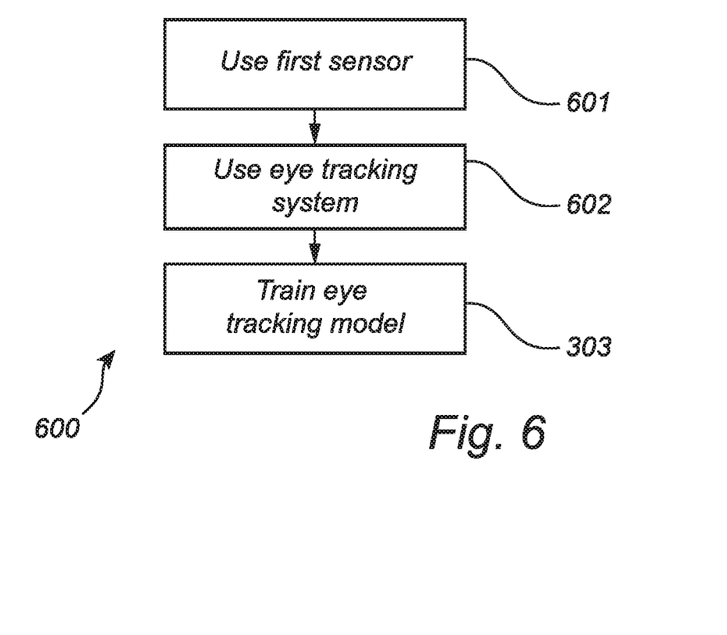
FIG. 6 is a flow chart of method for training an eye tracking model, including use of an eye tracking system such as the eye tracking system in FIG. 5, according to an embodiment.

FIG. 6 is a flow chart of method 600 for training an eye tracking model, including such explicit use of the first eye tracking sensor 411 and the eye tracking system 420, according to an embodiment. Although the method 600 is described below with reference to the eye tracking sensor 411 and the eye tracking system 420 shown in FIG. 4, it will be appreciated that a different eye tracking sensor and/or a different eye tracking system may be employed in the method 600.

The method 600 comprises using 601 the first eye tracking sensor 411 to obtain sensor data at a time instance. This corresponds to the sensor data received at step 301 in the method 300.

The method 600 comprises using 602 an eye tracking system 420 to generate reference eye tracking data for the time instance. The eye tracking system 420 comprises a second eye tracking sensor 421. The reference eye tracking data is generated by the eye tracking system 420 based on sensor data obtained by the second eye tracking sensor 421 at the time instance. In other words, the generated reference eye tracking data corresponds to the generated reference eye tracking data received at step 302 in the method 300.

The method 600 comprises training 303 the eye tracking model based on the sensor data obtained by the first eye tracking sensor 411 at the time instance and the generated reference eye tracking data. In other word, the method 600 comprises the same training step 303 as the method 300.

According to some embodiments, the eye tracking data predicted by the eye tracking model in the method 300 or the method 600 indicates a predicted gaze point of an eye, and the generated reference eye tracking data (received at step 302 of the method 300 or obtained at step 602 of the method 600) indicates a reference gaze point of the eye. The predicted gaze point and the reference gaze point may for example be gaze points at a display. This is exemplified in FIG. 5 where a predicted gaze point 508 and a reference gaze point 505 are shown at the display 503. A distance 509 between these two gaze points is also shown in FIG. 5

According to some embodiments, the eye tracking data predicted by the eye tracking model in the method 300 or the method 600 indicates a predicted gaze ray of an eye, and the generated reference eye tracking data (received at step 302 or obtained at step 602) indicates a reference gaze ray of the eye. This is exemplified in FIG. 7, which shows two example gaze rays. A first gaze ray 701 starts at a first estimated eye position 702 and is directed along a first gaze vector 703. A second gaze ray 704 starts at a second estimated gaze point 705 and is directed along a second gaze vector 706. The first gaze ray 701 may for example be a gaze ray predicted by the eye tracking model in the method 300 or the method 600, and the second gaze ray 704 may for example be a reference gaze ray indicated by the generated reference eye tracking data received at step 302 in the method 300 or obtained at step 602 in the method 300.

Figure 7:
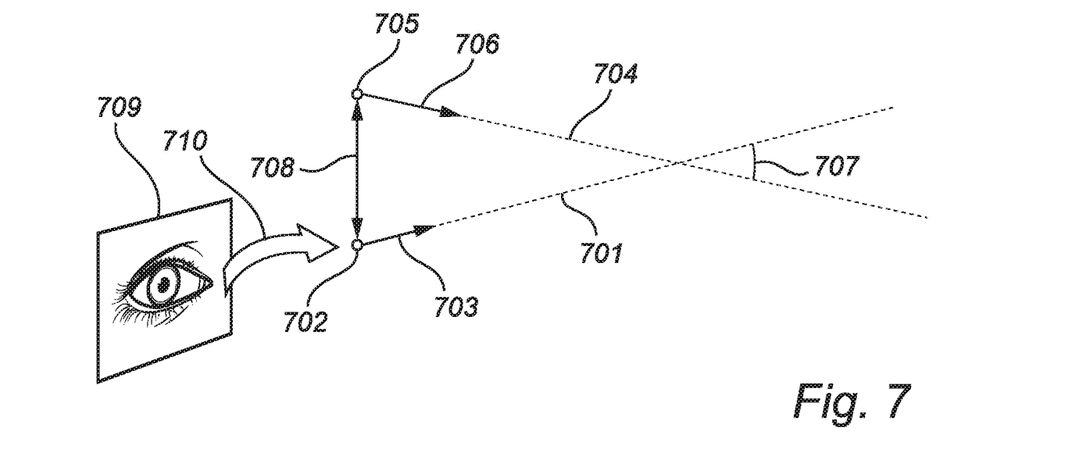
FIG. 7 shows examples of eye tracking data which may be predicted by an eye tracking model.

FIG. 7 also shows that a deviation between the gaze rays 701 and 704 may for example be measured via an angle 707 formed between the gaze vectors 703 and 706. A distance 708 may also be formed between the estimated eye positions 702 and 705. FIG. 7 also shows that sensor data (such as an image 709 of an eye) may be employed by an eye tracking model 710 to predict eye tracking data such as the gaze ray 701.

According to some embodiments, the eye tracking data predicted by the eye tracking model in the method 300 or the method 600 indicates a predicted position of an eye in space, and the generated reference eye tracking data (received at step 302 or obtained at step 602) indicates a reference position of the eye in space. This is exemplified in FIG. 7. The gaze origin 702 of the first gaze ray 701 in FIG. 7 may be an eye position predicted by the eye tracking model in the method 300 or the method 600. The gaze origin 705 of the second gaze ray 704 in FIG. 7 may be a reference eye position indicated by the generated reference eye tracking data received at step 302 in the method 300 or obtained at step 602 in the method 600.

Figure 8:
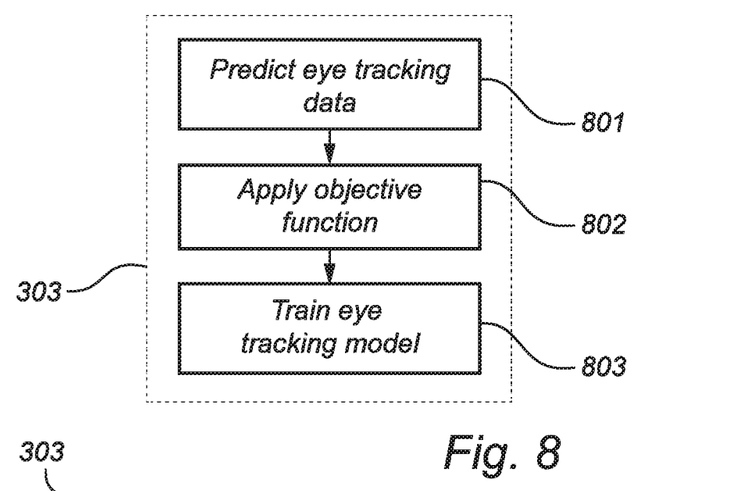
FIG. 8 shows a scheme for how an eye tracking model may be trained in the methods in FIGS. 3 and 6, according to an embodiment.

FIG. 8 shows a scheme for how an eye tracking model may be trained in the methods 300 and 600 described above with reference to FIGS. 3 and 6, according to an embodiment. In the present embodiment, the step of training 303 the eye tracking model comprises:

predicting 801 eye tracking data for the time instance using the eye tracking model and the sensor data obtained by the first eye tracking sensor at the time instance;

applying 802 an objective function to at least the eye tracking data predicted by the eye tracking model for the time instance and the generated reference eye tracking data; and updating 803 the eye tracking model.

In other words, an objective function (such as a cost function or loss function) is employed to evaluate whether or not the predictions made by the eye tracking model seem to be compatible with the reference eye tracking data. The eye tracking model is updated 803 to improve its ability to make accurate predictions.

The step 802 of applying the objective function may include inserting the eye tracking data predicted by the eye tracking model for the time instance and the generated reference eye tracking data into the objective function. It will be appreciated that the step 802 of applying the objective function may for example al so comprise inserting additional data into the objective function.

The step 803 of updating the eye tracking model may for example comprise modifying a value of at least one parameter of the eye tracking model. If the objective function is a cost function (or a loss function) which is supposed to have a low value if the prediction 801 is accurate, then the eye tracking model may for example be modified for reducing a value of the objective function (for example via graduate descent). If, on the other hand, the objective function is a function that should be maximized (for example if the objective function is a cost function multiplied by −1), then the eye tracking model may for example be modified for increasing a value of the objective function.

According to some embodiments, the step of applying 802 the objective function comprises forming a distance between a predicted gaze point indicated by the predicted eye tracking data for the time instance and a reference gaze point indicated by the generated reference eye tracking data. This is exemplified in FIG. 5 where a distance 509 between a predicted gaze point 508 and a reference gaze point 505 is illustrated. If the prediction provided by the eye tracking model is accurate, this distance 509 should be small.

According to some embodiments, the step of applying 802 the objective function comprises forming a deviation between a predicted gaze ray indicated by the predicted eye tracking data for the time instance and a reference gaze ray indicated by the generated reference eye tracking data. This is exemplified in FIG. 7, where the first gaze ray 701 corresponds to a gaze ray predicted by the eye tracking model in the method 300 or the method 600, and the second gaze ray 704 corresponds to a reference gaze ray indicated by the generated reference eye tracking data received at step 302 in the method 300 or obtained at step 602 in the method 600. The deviation between the predicted gaze ray 701 and the reference gaze ray 704 may for example be expressed in form of the angle 707 formed between the respective gaze vectors 703 and 706. If the prediction provided by the eye tracking model is accurate, this angle 707 should be small.

According to some embodiments, the step of applying 802 the objective function comprises forming a distance between a predicted eye position indicated by the predicted eye tracking data for the time instance and a reference eye position indicated by the generated reference eye tracking data. This is exemplified in FIG. 7, where the gaze origin 702 of the first gaze ray 701 corresponds to an eye position predicted by the eye tracking model in the method 300 or the method 600, and where the gaze origin 705 of the second gaze ray 704 corresponds to a reference eye position indicated by the generated reference eye tracking data received at step 302 in the method 300 or obtained at step 602 in the method 600. If the prediction provided by the eye tracking model is accurate, the distance 708 between the predicted eye position 702 and the reference eye position 705 should be small.

Figure 9:
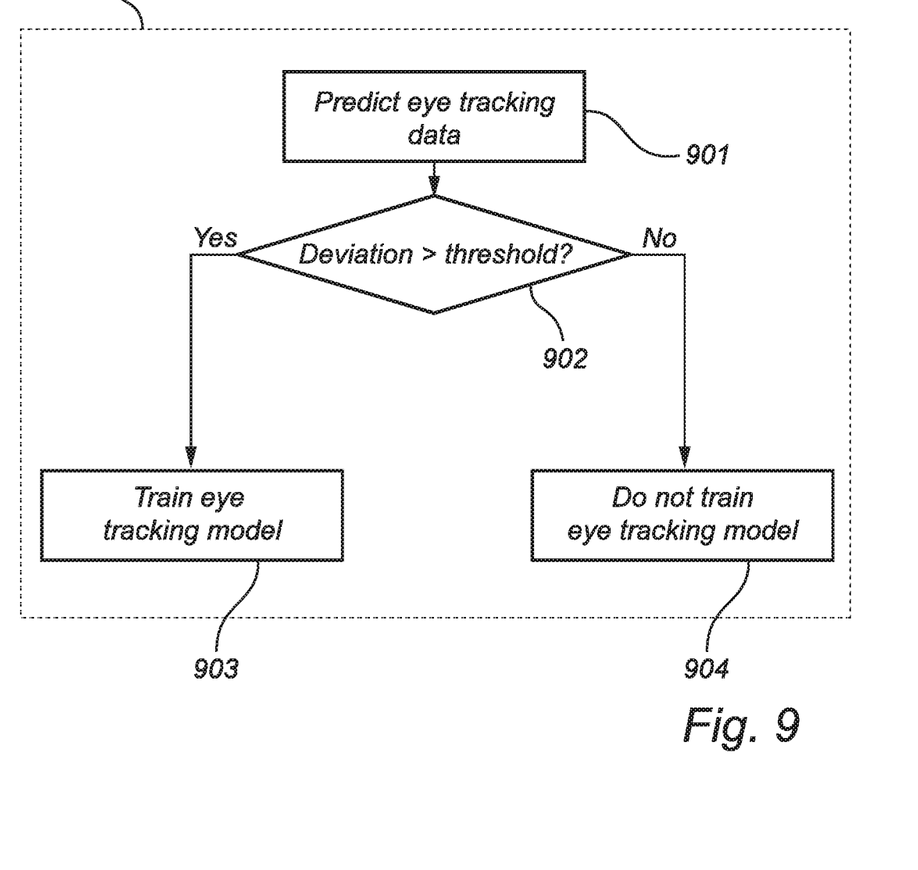
FIG. 9 shows a scheme for how training of an eye tracking model in the methods in FIGS. 3 and 6 may be performed in response to a certain condition being satisfied, according to an embodiment.

FIG. 9 shows a scheme for how training of the eye tracking model in the methods 300 and 600 described above with reference to FIGS. 6 and 7 may be performed, according to an embodiment. In the present embodiment, the step 303 of training the eye tracking model comprises predicting 901 eye tracking data for the time instance using the eye tracking model and the sensor data obtained by the first eye tracking sensor at the time instance. A check 902 is performed to see whether a deviation between the eye tracking data predicted 901 by the eye tracking model for the time instance and the generated reference eye tracking data (which is received at step 302 or generated at 20 step 602) exceeds a threshold. If the deviation exceeds the threshold, then the scheme/method proceeds by training 903 the eye tracking model based on the eye tracking data predicted by the eye tracking model for the time instance and the generated reference eye tracking data. If, on the other hand, the deviation does not exceed the threshold, then the eye tracking data predicted by the eye tracking model for the time instance and the generated reference eye tracking data may not be employed for training of the eye tracking model (as indicated by the step 904 in FIG. 9).

In other words, as long as the predicted gaze tracking data checks out with (or matches) the reference gaze tracking data, there may be no need to train the eye tracking model. If, on the other hand, it is detected that the predicted eye tracking data deviates from the reference eye tracking data, then training may be needed. The eye tracking model may for example perform well for some types of input data (or for some scenarios or user activities) but worse for other types of input data. The scheme described above with reference to FIG. 9 allows the eye tracking model to be trained for such types of input data where further training is actually needed, rather than training blindly for all types of input data.

The deviation employed at step 902 in FIG. 9 may for example be a deviation between a predicted gaze point and a reference gaze point, a deviation between a predicted gaze ray and a reference gaze ray, or a deviation between a predicted eye position and a reference eye position.

The threshold employed at step 902 in FIG. 9 may for example be predefined. However, embodiments may also be envisaged in which this threshold may be changed or modified.

Figure 10:
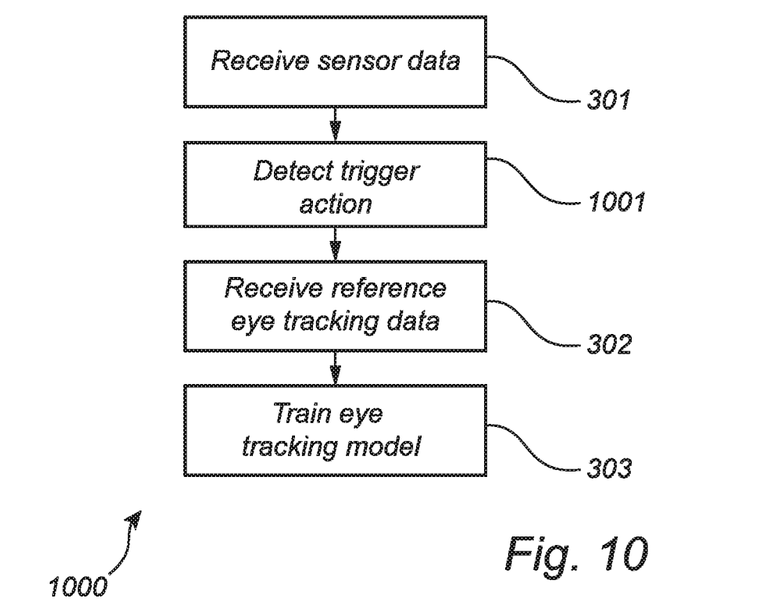
FIG. 10 shows a method of training an eye tracking model, including detection of a certain trigger action of the eye, according to an embodiment.

FIG. 10 shows a method 1000 of training an eye tracking model, according to an embodiment. The method 1000 is similar to the method 300 described above with reference to FIG. 3, but further comprises using 1001 the eye tracking system (exemplified in FIG. 4 by the eye tracking system 420) to detect a certain trigger action of an eye 100. The certain trigger action comprises:
  a fixation; and/or
  a saccade; and/or
  a smooth pursuit.

In the method 1000, the step 301 of receiving of the sensor data obtained by the first eye tracking sensor at the time instance and/or the step 303 of training of the eye tracking model may be performed in response to detection of the certain trigger action of the eye. In other words, if the trigger action is detected, then the data acquisition step 302 and the training step 303 may be performed. If, on the other hand, the trigger action is not detected, then the data acquisition step 302 and the training step 303 may be skipped, or the data acquisition step 302 may be performed and the training step 303 may skipped.

The method 1000 described above with reference to FIG. 10 allows the eye tracking model to be trained to handle certain scenarios better, such as fixations, saccades or smooth pursuits, rather than training the eye tracking model blindly for all types of input data. Certain scenarios may for example be particularly difficult for the eye tracking model to handle, or some scenarios may require better accuracy than other scenarios. It may therefore be useful to train the model specifically for such scenarios. The training of the eye tracking model may for example be based on training data collected in connection with the trigger action, such as during the trigger action, and/or shortly before the trigger action, and/or shortly after the trigger action.

In the method 1000, the trigger action may for example be detected by analyzing eye tracking data received from the eye tracking system, or an explicit indication of the trigger action may for example be received from the eye tracking system.

The method 1000 described above with reference to FIG. 10, is provided in the context of the method 300 described above with reference to FIG. 3. It will be appreciated that the method 1000 could easily be modified to instead be employed in the context of the method 600 described above with reference to FIG. 6. In other words, the step 602 and/or the step 303 in the method 600 may be made conditional upon detection of a certain trigger action of the eye 100, just like the steps 302 and 303 from the method 300.

Figure 11:
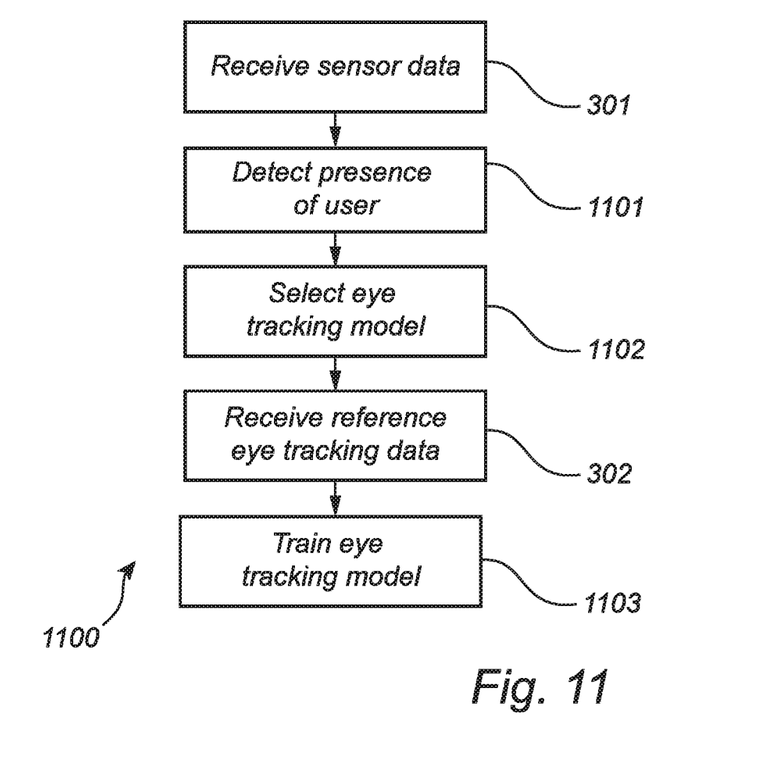
FIG. 11 is a flow chart of a method for training an eye tracking model for a detected user, according to an embodiment.

FIG. 11 is a flow chart of a method 1100 for training an eye tracking model, according to an embodiment. The method 1100 is similar to the method 300 described above with reference to FIG. 3, but the method 1100 includes new steps 1101-1102, and the step 303 is expressed in terms of a new step 1103. In the present embodiment, the eye tracking model is one of several eye tracking models. The eye tracking models are associated with respective potential users or persons.

The method 1100 comprises detecting 1101 presence of a user (or of a person), and selecting 1102 the eye tracking model associated with the user (or person). Presence of the user may for example be detected 1101 by the eye tracking system, or via the first eye tracking sensor. Presence of the user may for example be detected via biometric data (such as facial recognition, or a finger or, or an iris scan) or via some kind of credential (such as a smart card or a wireless sensor tag). The eye tracking model may for example be selected 1102 from a database of potential users and their respective eye tracking models.

The method 1100 comprises training 1103 the selected eye tracking model based on the sensor data obtained by the first eye tracking sensor at the time instance (in other words, the sensor data received at step 301) and the generated reference eye tracking data (in other words, reference eye tracking data received at step 302).

The method 1100 described above with reference to FIG. 11, is provided in the context of the method 300 described above with reference to FIG. 3. It will be appreciated that the method 1100 could easily be modified to instead be employed in the context of the method 600 described above with reference to FIG. 6. More specifically, the step 301-302 in the method 1100 could for example be replaced by the steps 601-602 from the method 600.

According to some embodiments, the method 300 described above with reference to FIG. 3 may be extended to perform training for sensor data from a sequence of time instances. More specifically, the method 300 may comprise:
  receiving sensor data obtained by the first eye tracking sensor at a sequence of time instances;
  receiving reference eye tracking data for the sequence of time instances generated by the eye tracking system, wherein the reference eye tracking data for the sequence of time instances is generated by the eye tracking system based on sensor data obtained by the second eye tracking sensor at the sequence of time instances; and
  training the eye tracking model based on the sensor data obtained by the first eye tracking sensor for the sequence of time instances and the generated reference eye tracking data for the sequence of time instances, and/or storing the sensor data obtained by the first eye tracking sensor for the sequence of time instances and the generated reference eye tracking data for the sequence of time instances.

In other words, data for the time instances may be employed for training the eye tracking model, or may be stored for use in training later on. The training data may for example be stored in a database or may be uploaded to the cloud. Training of the eye tacking data may for example be performed at a remote location from where the training data was collected. Training of the eye tracking model may for example be performed gradually as training data becomes available. Alternatively, plenty a training data may be collected first and training may then be performed using the collected training data. After the eye tracking model has been sufficiently trained, it may for example be employed in an eye tracking system to predict eye tracking data in real time.

The methods and schemes described above with reference to FIGS. 3-11 represent a first aspect of the present disclosure. The system 400 described above with reference to FIG. 4 represents a second aspect of the present disclosure. The system 400 (or the processing circuitry 430 of the system 400) may for example be configured to perform the method of any of the embodiments of the first aspect described above. The system 400 may for example be configured to perform the method 300 described above with reference to FIG. 3 or the method 600 described above with reference to FIG. 6.

The system 400 may for example comprise processing circuitry 430 (or one or more processors 431) and one or more memories 432, the one or more memories 432 containing instructions executable by the processing circuitry 430 (or one or more processors 431) whereby the system 400 is operable to perform the method of any of the embodiments of the first aspect disclosed herein.

As described above with reference to FIG. 4, the system 400 need not necessarily comprise all the elements shown in FIG. 4.

A third aspect of the present disclosure is represented by embodiments of a non-transitory computer-readable storage medium 432 storing instructions which, when executed by the system 400 (or by processing circuitry 430 of the system 400), cause the system 400 to perform the method of any of the embodiments of the first aspect described above (such as the method 300 described above with reference to FIG. 3, or the method 600 described above with reference to FIG. 6).

As described above with reference to FIG. 4, the storage medium 432 need not necessarily be comprised in the system 400.

The person skilled in the art realizes that the proposed approach presented in the present disclosure is by no means limited to the preferred embodiments described above. On the contrary, many modifications and variations are possible within the scope of the appended claims. For example, the embodiments described above with reference to FIGS. 1-11 may be combined to form further embodiments. Further, it will be appreciated that the system 400 shown in FIG. 400 is merely intended as an example, and that other systems may also perform the methods described above with reference to FIGS. 1-11. It will also be appreciated that the method steps described with reference to FIGS. 3, 6, 8, 9, 10, and 11 need not necessarily be performed in the specific order shown in these figures.

It will be appreciated that processing circuitry 430 (or one or more processors) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 432 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

What is claimed is:

1. A method for training an eye tracking model, wherein the eye tracking model is adapted to predict eye tracking data based on sensor data from a first eye tracking sensor of a first eye tracking system, wherein the first eye tracking sensor is arranged to monitor an eye, the method comprising:
   receiving first sensor data obtained by the first eye tracking sensor at a time instance;
   receiving reference eye tracking data for an approximately same time instance generated by a second eye tracking system comprising a second eye tracking sensor arranged to monitor the eye, wherein the reference eye tracking data is generated by the second eye tracking system based on second sensor data obtained by the second eye tracking sensor at the approximately same time instance; and
   training the eye tracking model based on the first sensor data obtained by the first eye tracking sensor at said time instance and the generated reference eye tracking data for the approximately same time instance.

2. The method of claim 1, further comprising using the first eye tracking sensor to obtain the first sensor data at said time instance.

3. The method of claim 1, further comprising using the eye tracking system to generate the reference eye tracking data for the approximately same time instance.

4. The method of claim 1, wherein the eye tracking data predicted by the eye tracking model indicates a predicted gaze point of the eye, and wherein the generated reference eye tracking data indicates a reference gaze point of the eye.

5. The method of claim 1, wherein the eye tracking data predicted by the eye tracking model indicates a predicted gaze ray of the eye, and wherein the generated reference eye tracking data indicates a reference gaze ray of the eye.

6. The method of claim 1, wherein the eye tracking data predicted by the eye tracking model indicates a predicted position of the eye in space, and wherein the generated reference eye tracking data indicates a reference position of the eye in space.

7. The method of claim 1, further comprising:
   predicting eye tracking data for said time instance using the eye tracking model and the first sensor data obtained by the first eye tracking sensor at said time instance;
   applying an objective function to at least the eye tracking data predicted by the eye tracking model for the approximately same time instance and the generated reference eye tracking data; and
updating the eye tracking model.

8. The method of claim 7, wherein applying the objective function to at least the eye tracking data predicted by the eye tracking model for said time instance and the generated reference eye tracking data for the approximately same time instance comprises forming a distance between a predicted gaze point indicated by the predicted eye tracking data for said time instance and a reference gaze point indicated by the generated reference eye tracking data.

9. The method of claim 7, wherein applying the objective function to at least the eye tracking data predicted by the eye tracking model for said time instance and the generated reference eye tracking data for the approximately same time instance comprises forming a deviation between a predicted gaze ray indicated by the predicted eye tracking data for said time instance and a reference gaze ray indicated by the generated reference eye tracking data.

10. The method of claim 7, wherein applying the objective function to at least the eye tracking data predicted by the eye tracking model for said time instance and the generated reference eye tracking data for the approximately same time instance comprises forming a distance between a predicted eye position indicated by the predicted eye tracking data for said time instance and a reference eye position indicated by the generated reference eye tracking data.

11. The method of claim 1, wherein at least one of the first eye tracking sensor and the second eye tracking sensor is an imaging device.

12. The method of claim 1, wherein the second eye tracking system comprises an illuminator which outputs light within a wavelength range for illuminating the eye and the second eye tracking sensor provides the second sensor data based on light within said wavelength range; and
wherein the first eye tracking sensor is provided with a filter for suppressing light within said wavelength range.

13. The method of claim 1, further comprising:
predicting eye tracking data for said time instance using the eye tracking model and the first sensor data obtained by the first eye tracking sensor at said time instance; and
in response to a deviation between the eye tracking data predicted by the eye tracking model for said time instance and the generated reference eye tracking data for the approximately same time instance exceeding a threshold, training the eye tracking model based on the eye tracking data predicted by the eye tracking model for said time instance and the generated reference eye tracking data for the approximately same time instance.

14. The method of claim 1, further comprising:
using the eye tracking system to detect a trigger action of the eye, wherein the trigger action comprises one or more of a fixation, a saccade, or a smooth pursuit; and
in response to detection of the trigger action of the eye, perform at least one of the receiving of the first sensor data obtained by the first eye tracking sensor at the time instance or the training of the eye tracking model.

15. The method of claim 1, wherein the eye tracking model is one of several eye tracking models associated with respective potential users, the method further comprising:
detecting presence of a user;
selecting the eye tracking model associated with the user; and
training the selected eye tracking model based on the first sensor data obtained by the first eye tracking sensor at said time instance and the generated reference eye tracking data for the approximately same instance.

16. The method of claim 1, further comprising:
receiving sensor data obtained by the first eye tracking sensor at a sequence of time instances;
receiving reference eye tracking data for the sequence of time instances generated by the eye tracking system, wherein the reference eye tracking data for the sequence of time instances is generated by the eye tracking system based on sensor data obtained by the second eye tracking sensor at said sequence of time instances; and
training the eye tracking model based on the sensor data obtained by the first eye tracking sensor for the sequence of time instances and the generated reference eye tracking data for the sequence of time instances, or storing the sensor data obtained by the first eye tracking sensor for the sequence of time instances and the generated reference eye tracking data for the sequence of time instances.

17. A system for training an eye tracking model, wherein the eye tracking model is adapted to predict eye tracking data based on sensor data from a first eye tracking sensor of a first eye tracking system, wherein the first eye tracking sensor is arranged to monitor an eye, the system comprising processing circuitry configured to:
receive first sensor data obtained by the first eye tracking sensor at a time instance;
receive reference eye tracking data for an approximately same time instance generated by a second eye tracking system comprising a second eye tracking sensor arranged to monitor the eye, wherein the reference eye tracking data is generated by the second eye tracking system based on second sensor data obtained by the second eye tracking sensor at the approximately same time instance; and
train the eye tracking model based on the first sensor data obtained by the first eye tracking sensor at said time instance and the generated reference eye tracking data for the approximately same time instance.

18. The system of claim 17, further comprising the first eye tracking sensor, wherein the processing circuitry is further configured to use the first eye tracking sensor to obtain the first sensor data at said time instance.

19. The system of claim 17, further comprising the second eye tracking system, the processing circuitry being further configured to use the second eye tracking system to generate the reference eye tracking data for the approximately same time instance.

20. The system of claim 17, wherein at least one of the first eye tracking sensor and the second eye tracking sensor is an imaging device.

21. The system of claim 17, wherein the second eye tracking system comprises an illuminator which is configured to output light within a wavelength range for illuminating the eye;
wherein the second eye tracking sensor is configured to provide the second sensor data based on light within said wavelength range; and
wherein the first eye tracking sensor is provided with a filter for suppressing light within said wavelength range.

22. The system of claim 17, wherein the processing circuitry is further configured to train the eye tracking model by at least:

predicting eye tracking data for said time instance using the eye tracking model and the first sensor data obtained by the first eye tracking sensor at said time instance; and in response to a deviation between the eye tracking data predicted by the eye tracking model for said time instance and the generated reference eye tracking data for the approximately same time instance exceeding a threshold, training the eye tracking model based on the eye tracking data predicted by the eye tracking model for said time instance and the generated reference eye tracking data for the approximately same time instance.

23. The system of claim 17, wherein the processing circuitry is further configured to:

use the eye tracking system to detect a trigger action of the eye, wherein the trigger action comprises one or more of a fixation, a saccade, or a smooth pursuit; and in response to detection of the trigger action of the eye, perform at least one of the receiving of the first sensor data obtained by the first eye tracking sensor at the time instance or the training of the eye tracking model.

24. A non-transitory computer-readable storage medium storing instructions for training an eye tracking model, wherein the eye tracking model is adapted to predict eye tracking data based on sensor data from a first eye tracking sensor of a first eye tracking system, wherein the first eye tracking sensor is arranged to monitor an eye, wherein the instructions, when executed by a system, cause the system to:

receive first sensor data obtained by the first eye tracking sensor at a time instance;

receive reference eye tracking data for an approximately same time instance generated by a second eye tracking system comprising a second eye tracking sensor arranged to monitor the eye, wherein the reference eye tracking data is generated by the second eye tracking system based on second sensor data obtained by the second eye tracking sensor at the approximately same time instance; and train the eye tracking model based on the first sensor data obtained by the first eye tracking sensor at said time instance and the generated reference eye tracking data for the approximately same time instance.

\* \* \* \* \*